United States Patent
Mahalingam et al.

[11] Patent Number: 6,134,678
[45] Date of Patent: *Oct. 17, 2000

[54] METHOD OF DETECTING NETWORK ERRORS

[75] Inventors: Mallikarjunan Mahalingam, Santa Clara; Walter August Wallach, Los Altos, both of Calif.

[73] Assignee: 3Com Corporation, Santa Clara, Calif.

[*] Notice: This patent is subject to a terminal disclaimer.

[21] Appl. No.: 08/942,573

[22] Filed: Oct. 1, 1997

Related U.S. Application Data

[60] Provisional application No. 60/046,491, May 13, 1997.

[51] Int. Cl.$^7$ .............................. H04B 1/74; G06F 11/07
[52] U.S. Cl. .......................... 714/48; 709/239; 370/409
[58] Field of Search ................................. 714/48, 49, 50, 714/7, 8, 4, 41, 43, 47, 55, 56; 710/102, 103; 370/409; 709/239

[56] References Cited

U.S. PATENT DOCUMENTS

| | | |
|---|---|---|
| 5,123,017 | 6/1992 | Simpkins et al. ...................... 371/15.1 |
| 5,210,855 | 5/1993 | Bartol . |
| 5,261,094 | 11/1993 | Everson et al. .......................... 395/600 |
| 5,272,584 | 12/1993 | Austruy et al. ............................ 361/58 |
| 5,337,413 | 8/1994 | Lui et al. ................................. 395/275 |
| 5,379,409 | 1/1995 | Ishikawa ................................. 395/575 |
| 5,444,856 | 8/1995 | Bowers et al. ....................... 395/200.1 |
| 5,473,599 | 12/1995 | Li et al. ...................................... 714/4 |
| 5,485,607 | 1/1996 | Lomet et al. ............................ 395/600 |
| 5,491,694 | 2/1996 | Oliver et al. ............................ 370/85.4 |
| 5,500,945 | 3/1996 | Maeda et al. ....................... 395/185.09 |
| 5,539,883 | 7/1996 | Allon et al. . |
| 5,564,024 | 10/1996 | Pemberton .............................. 395/283 |
| 5,572,528 | 11/1996 | Shuen ...................................... 370/402 |
| 5,579,491 | 11/1996 | Jeffries et al. . |
| 5,592,610 | 1/1997 | Chittor . |
| 5,604,873 | 2/1997 | Fite et al. ................................ 395/283 |
| 5,608,876 | 3/1997 | Cohen et al. ........................... 395/281 |
| 5,613,096 | 3/1997 | Danknick ................................ 395/500 |
| 5,644,731 | 7/1997 | Liencres et al. ........................ 395/283 |
| 5,732,247 | 3/1998 | Dearth et al. ........................... 395/500 |
| 5,781,534 | 7/1998 | Perlman et al. ........................ 370/248 |
| 5,809,021 | 9/1998 | Diaz et al. ............................... 370/364 |
| 5,822,531 | 10/1998 | Gorczyca et al. ....................... 709/221 |
| 5,917,997 | 6/1999 | Bell et al. ................................... 714/4 |
| 5,923,854 | 7/1999 | Bell et al. ............................... 370/409 |
| 5,930,259 | 7/1999 | Katsube et al. ......................... 370/409 |
| 5,951,650 | 9/1999 | Bell et al. ............................... 709/238 |
| 5,983,371 | 11/1999 | Lord et al. ................................ 714/55 |
| 6,002,918 | 12/1999 | Heiman et al. ........................ 455/38.3 |

OTHER PUBLICATIONS

Bhide et al, "A Highly Available Network File Server," USENIX, IEEE, pp. 199–204, 1991.

"Fault–Tolerant Architecture for Communication Adapters and Systems," IBM Technical Disclosure Bulletin vol. 35 No. 7, pp. 300–303, Dec. 1992.

NetFRAME Systems Incorporated, *News Release*, 3 pages, referring to May 9, 1994, "NetFRAME's New High–Availability ClusterServer Systems Avoid Scheduled as well as Unscheduled Downtime."

NetFRAME Systems Incorporated, *datasheet*, 2 pages, Feb. 1996, "NF450FT Network Mainframe."

NetFRAME Systems Incorporated, *datasheet*, 9 pages, Mar. 1996, "NetFRAME Cluster Server 8000."

Herr, et al., Linear Technology Magazine, *Design Features*, pp. 21–23, Jun. 1997, "Hot Swapping the PCI Bus."

*Primary Examiner*—Robert W. Beausoliel, Jr.
*Assistant Examiner*—Christopher Alan Revak
*Attorney, Agent, or Firm*—Erik L. Oliver; Wilson, Sonsini, Goodrich & Rosati

[57] ABSTRACT

A method is described for providing fault tolerance within a computer system. The method allows multiple network interface cards to reside within the same computer system. If a primary network interface card fails, a secondary network interface card automatically begins managing the network communications. In addition, a method of load-sharing data transmissions between each network interface card installed in a server computer is described.

11 Claims, 8 Drawing Sheets

| 700 DESTINATION ADDRESS | 702 SOURCE ADDRESS | 704 PACKET TYPE | 706 ADAPTER ID |
|---|---|---|---|

FIG. 5

| 800 ACS CTL | 802 FRM CTL | 804 DESTINATION ADDRESS | 806 SOURCE ADDRESS | 808 DSAP | 810 SSAP | 812 CTL | 814 PROTOCOL | 816 PACKET TYPE | 818 ADAPTER ID |
|---|---|---|---|---|---|---|---|---|---|

FIG. 6

METHOD OF DETECTING NETWORK ERRORS

PRIORITY

The benefit under 35 U.S.C. § 119(e) of the following U.S. provisional application(s) is hereby claimed: "Means for Allowing Two or More Network Interface Controller Cards to Appear as One Card to an Operating System" 60/046,491 May 13, 1997.

RELATED APPLICATIONS

The subject matter of U.S. patent application entitled "System for Detecting Network Errors", filed on Oct. 1, 1997, Application No. 08/942,407, and having attorney Docket No. MNFRAME.060A is related to this application.

COPYRIGHT RIGHTS

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

This invention relates to methods of detecting errors in a network environment. Specifically, this invention relates to methods of detecting faulty network interface cards within a computer system.

2. Related Art

Personal computers (PCs) have undergone evolutionary changes since the original models based on the Intel 8088 microprocessor, such as the International Business Machine Corporation (IBM) PC and other IBM-compatible machines. As the popularity of PCs have grown, so has the demand for more advanced features and increased capability, reliability and speed. Higher order microprocessors such as the Intel 20286, 30386, 40486, and more recently, the Pentium series have been developed. The speed of the fastest of these processors, the Pentium II series is 266 MHz as opposed to the 8 MHz clock speed for the 8088 microprocessor.

Faster bus architectures have been developed to support the higher processor speeds. Modem computer systems typically include one or more processors coupled through a system bus to main memory. The system bus also typically couples to a high bandwidth expansion bus, such as the Peripheral Component Interconnect (PCI) bus which operates at 33 MHz and is capable of transferring data at a rate of 133 MBps. High speed devices such as small computer systems interface (SCSI) adapters, network interface cards (NIC), video adapters, etc. can be coupled to a PCI bus. An older type low bandwidth bus such as the Industry Standard Architecture (ISA), also referred to as the AT bus, is generally coupled to the system bus as well. This bus operates at 6 MHz. To the ISA bus are attached various low speed devices such as keyboard, Basic Input/Output System (BIOS) and parallel and communications ports. These devices are known as legacy devices because they trace their lineage, their legacy, back to the initial PC architecture introduced by IBM in 1982.

With the enhanced processor and bus speeds the PC now is utilized to perform as a server, and to provide high speed data transfers between, for example, a network and a storage device. However, because modern PCs are not designed to provide very sophisticated levels of fault tolerance, systems and methods must be devised to protect users from hardware failures. This is particularly important in server computers. For example, there is currently no inexpensive and direct mechanism for allowing a PC using one or more arbitrary LAN protocols to contain several network interface cards that act in a fault tolerant manner so that if one fails, the other card automatically takes over responsibility for routing network server traffic. Thus, a need exists for a simple, inexpensive system that allows multiple network interface cards to reside within a standard personal computer and provide fault tolerant capabilities.

SUMMARY OF THE INVENTION

One embodiment of the invention is a method in a computer system of transferring control of network traffic from a first network interface card (NIC) to a second NIC. The method includes a) determining the physical address of a primary network interface card (NIC); b) assigning said physical address to a plurality of secondary network interface cards; c) sending data packets from a protocol stack to said physical address; d) analyzing said primary NIC to determine if it is failing; e) disabling said primary NIC if errors are detected; and f) enabling one of said plurality of secondary network interface cards.

Another embodiment of the invention is a method of load balancing network traffic between a plurality of network interface cards, including: a) determining the physical address of a primary network interface card (NIC); b) assigning said physical address to a plurality of secondary network interface cards; and c) routing a portion of the data packets sent to said physical address of said primary NIC to one of said plurality of secondary network interface cards.

Yet another embodiment of the invention is a method in a computer of providing a fault tolerant network connection. This embodiement includes a) sending a data packet from a protocol stack to an intermediate driver, wherein said intermediate driver is in communication with a primary network interface card (NIC) and a secondary NIC; b) determining whether said primary NIC has failed; and c) re-routing said data packet to said secondary NIC if said primary NIC has failed.

Still another embodiment of the invention is a method for disabling a failing network interface card, including: a) sending a probe packet from a protocol stack to a virtual adapter interface on an intermediate driver; b) forwarding said probe packet from a transport protocol interface on said intermediate driver to a first network interface card (NIC); c) attempting to receive said probe packet at a secondary NIC; and d) disabling said first NIC if said probe packet is not received.

BRIEF DESCRIPTION OF THE DRAWINGS

FIG. 5 is a block diagram illustrating one embodiment of the structure of a probe packet for an Ethernet network system.

FIG. 6 is a block diagram illustrating one embodiment of the structure of a probe packet for a FDDI or Token Ring network system.

DETAILED DESCRIPTION OF THE INVENTION

Figure 1:
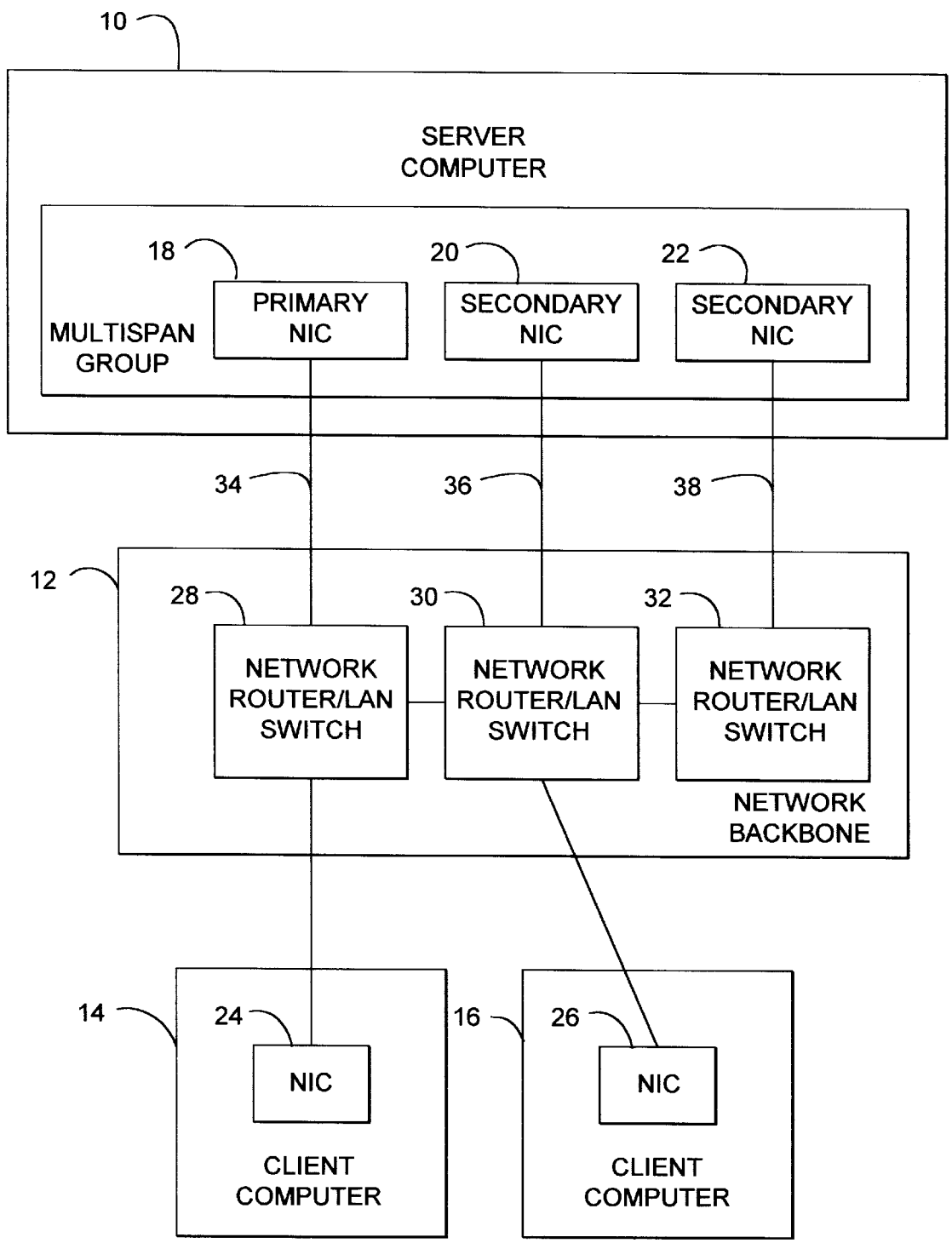
FIG. 1 is a block diagram illustrating one embodiment of a server computer and client computers linked in a network through network interface cards.

The present invention includes a system providing failure detection and re-routing of network packets in a computer having multiple network interface cards (NICs) connected as groups (MULTISPAN groups) each to a common network segment. In addition, embodiments of the invention include load sharing to distribute network packet traffic across the NICs in a group. Further, the present invention may provide this benefit to all traffic regardless of the network protocol used to route the traffic (i.e., in a protocol independent manner).

Fault detection and recovery is accomplished by "MULTISPAN", a process operating within the system. For each group of NICs, if there is a failure virtually on any component related to network traffic, the MULTISPAN process detects the interruption of the data flow and determines which NIC is no longer working. MULTISPAN directs traffic through only the working NICs until the failed NIC is again able to send and receive traffic reliably. Restoring a NIC to reliable operation may involve such steps as replacing a failed NIC (in a computer which supports the hot replacement of failed components), reconnecting or replacing a cable, replacing a failed network switch or router. By placing each NIC in the server on a separate path to the network, MULTISPAN will normally keep the system running until repairs can be accomplished. Being able to schedule repairs decreases cost of owning and operating the computer system.

The MULTISPAN system can be implemented in many different forms, as discussed below. Programming languages such as C, C++, Cobol, Fortran, Basic or any other conventional language can be employed to provide the functions of the MULTISPAN system. In addition, software related to the MULTISPAN system can be stored within many types of programmed storage devices. A programmed storage device can be a Random Access Memory, Read-Only Memory, floppy disk, hard disk, CD-ROM or the like.

In one embodiment, the present invention identifies one NIC, called the primary, by which the entire group is identified. Some operating systems disallow more than a single NIC on a single network segment. For such operating systems, this embodiment uses the primary to represent the entire group to the operating system. The remaining NICs in the group are hidden from the operating system.

In one embodiment of the invention, network failures are detected by a process of sending out "probe" packets with in a MultiSpan group from primary NIC to secondary NIC(s) and vice versa. If the probe packet fails to arrive at the target NIC, the failing path is determined and recovery procedure is performed. The MULTISPAN process confirms the source NIC that has failed by repeatedly sending packets to every other NIC in the group until, by process of elimination, the failing NIC is determined. If the failing NIC is a primary NIC, the MULTISPAN process stops routing network traffic through this unreachable/failed NIC. Traffic is thereafter directed through one of the remaining NIC(s), which is designated as the new primary (this process of designating a new primary when the current one fails is called fail-over). MULTISPAN continues to attempt to send probe packets to and from the failing NIC and, should probe packets once again be successfully delivered, the NIC is returned to service as a secondary.

In an embodiment of the present invention, the traffic load for a network segment is shared among all NICs in the group connected to the segment. Traffic inbound to the server from the network segment may arrive through any NIC in the group, and be properly delivered by MULTISPAN to the operating system. In some situations, all inbound traffic arrives through a single NIC (usually the primary), while in others traffic may arrive through all NICs at once. Traffic outbound from the server to the network segment is directed through some or all NICs in the group according to some algorithm which may vary from one embodiment to another, or may vary within one embodiment from one group to another.

FIG. 1 is an illustration of a server computer 10 linked through a network backbone 12 to client computers 14 and 16. The server computer 10 can be any well-known personal computer such as those based on an Intel microprocessor, Motorola microprocessor, Cyrix microprocessor or Alpha microprocessor. Intel microprocessors such as the Pentium®, Pentium® Pro and Pentium® II are well-known within the art. The server computer 10 includes a group of network interface cards (NICs) 18, 20, 22 which provide communications between the server computer 10 and the network backbone 12. Similarly, the client computer 14 includes a network interface card 24 and the client computer 16 includes a network interface card 26 for communicating with the network backbone 12. The network backbone 12 may be a cable such as a 10B2 Thin Ethernet cable, an Ethernet 10BT workgroup hub such as a 3Com Hub 8/TPC, or several interconnected switches or routers 28, 30, 32 such as a Cisco Catalyst 500, as shown in FIG. 1.

As will be explained in more detail below, the client computers 14 and 16 make requests for information from the server computer 10 through the network backbone 12. Under normal circumstances, the requests made by the client computers are acknowledged through the primary network interface card 18 to the server computer 10. However, if the primary network interface card 18, or cable 34 or switch or router 28 fails, the embodiments of the present invention provide a mechanism for routing network requests through one of the secondary network interface cards 20 or 22. The re-routing of network requests is transparent to the client computer 14 or 16.

Figure 2:
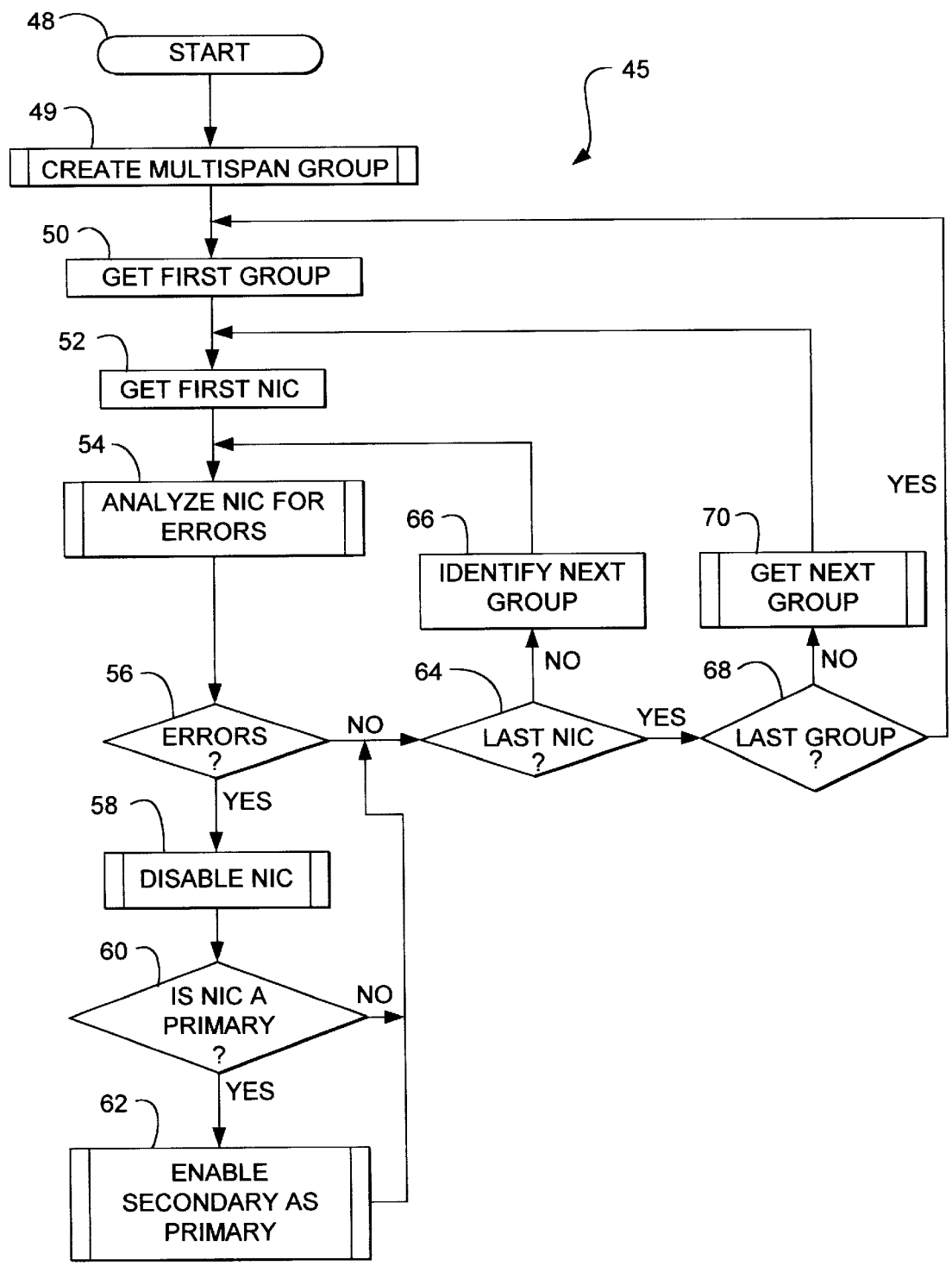
FIG. 2 is a flow diagram illustrating one embodiment of the overall process of detecting faulty network interface cards and automatically switching from a primary network interface card to a secondary network interface card.

FIG. 2 depicts one embodiment of the overall process 45 of detecting errors for NICs located in a MultiSpan group. The process 45 begins at a start state 48 and then moves to process 49 wherein a MULTISPAN group is created. During process 49, a user identifies the NICs to be grouped and issues a command to the MULTISPAN system to create a group. In one embodiment, the command is issued through a command prompt. In another embodiment, the command is issued through a management application which may be remote from or local to the computer system 10, and directed to the present invention via the simple network management protocol (SNMP) and associated SNMP agent software. If there is an error, the user is notified that there is a failure in creating the group. Otherwise, the user is returned with a prompt indicating that the MULTISPAN group was created successfully. The binding process will be discussed in more detail below. The MULTISPAN process uses the user-supplied information to associate all NICs in a particular group together and with their primary NIC.

The process 45 then moves to state 50 wherein the first MultiSpan group is retrieved. Proceeding to state 52, the first NIC in the current group is retrieved. At process state 54 the first NIC is analyzed to determine whether it is functioning properly, or is failing. The process 45 then moves to decision state 56 to determine whether any errors were detected. If a failure was detected at the decision state 56 for this NIC, the process 45 proceeds to state 58, wherein the NIC is disabled from the MULTISPAN group. The process 45 then proceeds to decision state 60 to determine whether the disabled NIC was a primary NIC. If a determination is made at state 60 that the failed NIC is a primary, the process 45 moves to process state 62 and enables the secondary NIC as a primary. The process 45 then moves to decision state 64 to determine whether the current NIC is the last NIC in the MULTISPAN group. Similarly, if a determination is made at the decision state 56 that there were no errors, the process 45 also moves to decision state 64.

If a determination is made at the decision state 64 that there are more NICs in this MULTISPAN group, then process 45 moves to state 66 to select the next NIC to analyze. The process 45 then returns to process state 54 to analyze the newly selected NIC for errors.

If a determination is made at the decision state 64 that there are no more NICs in the current MULTISPAN group, the process 45 proceeds to decision state 68 to check whether this was the last group. If a determination is made that this is not the last group, the process 45 moves to process state 70 and selects the next group. The process 45 then returns to state 52 to begin analyzing the group's NICs. If a determination is made at the decision state 68 that this is the last group, the process 45 returns to state 50 to begin checking the first group once again.

Novell Netware Implementation

Figure 3:
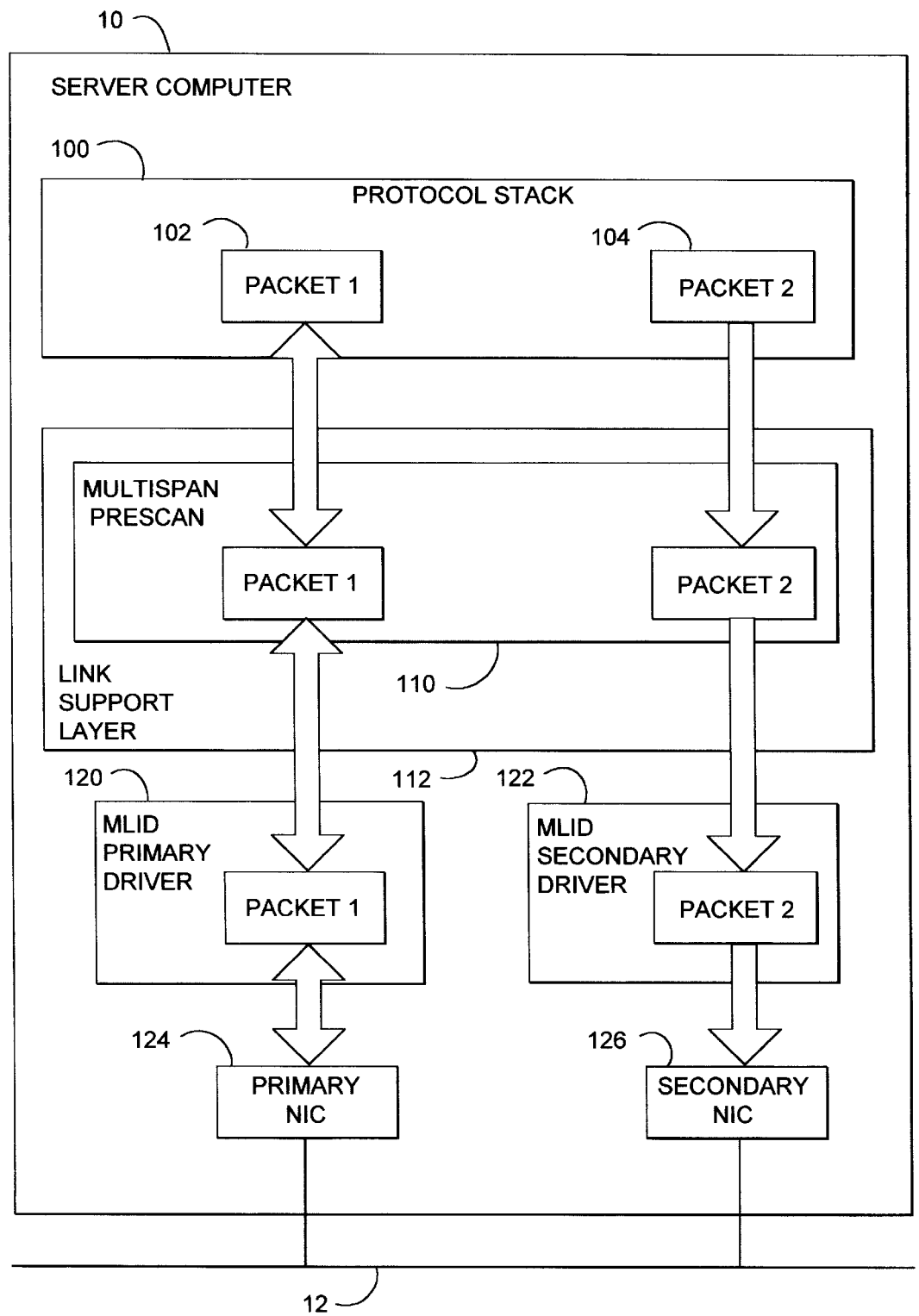
FIG. 3 is a block diagram illustrating an implementation of software modules running within a server computer under a Novell Netware network operating system.

Referring now to FIG. 3, an overview of the software modules running within the server computer 10 is illustrated. In the implementation described below, the server computer 10 is running under the Novell Netware operating system. As shown, a protocol stack 100 includes a first data packet 102 and a second data packet 104. In this figure, the protocol stack is the IPX (InternetNetwork Packet Exchange) protocol but could include TCP/IP or NETBEUI or any other network packet protocols in combinations for transmitting data across a network. As is known, generally client computers request data from server computers by attempting to read particular files within the server computer. In order for the client computers and server computer 10 to communicate across cables, the data is broken into a series of data packets. These data packets include network routing information and small portions of the requested data. The network packets are then routed from the server computer to the requesting client computer and thereafter rebuilt into the requested data file.

As is known, the link support layer (LSL) is the interface between drivers and protocol stacks within the Novell NetWare operating system. More information on the link support layer 112 and prescan drivers can be found in the Novell LAN Developer Guide (Novell Corporation, Orem Utah).

The main objectives embodiments of the MULTISPAN processes are (1) to load share LAN traffic among NICs in a group, and (2) to perform a transparent fail-over when a primary adapter in a group fails. These features may be achieved essentially without modification to the transport protocol portions of the packets. Instead, the features are achieved through system services provided for interfacing with LAN drivers and other Netware system modules like the Media Specific Module (SM), Topology Specific Module (TSM) and Link Support Layer (LSL). The MULTISPAN process may be a totally media-dependent intermediate module.

Once drivers for primary and secondary NICs are loaded, a multispan group can be created by issuing MSP BIND statement, specifying the slot numbers of primary and secondary adapters. If there are any protocol stacks bound to the secondary NIC, the MULTISPAN process displays an error message and does not create a MULTISPAN group.

The user can optionally specify more than one secondary NIC when creating a group. Typically this is done to allow load sharing of the outbound LAN traffic across all the NICs. If any LAN drivers had been loaded before loading MSP.NLM, then MSP BIND command does not create any MULTISPAN groups and displays the error message "Error locating DCT Address in Internal Table". Thus, the MSP-.NLM module should be loaded before any LAN drivers. As discussed above, MSP.NLM module should normally be loaded under Netware through the STARTUP.NCF file.

The MULTISPAN system allows users to configure LAN cards of same topology, but different kind (example Intel Smart card and Intel Pro 100B card) into a MULTISPAN group. For example, issuing the following commands will load several Ethernet cards and bind them into a MULTISPAN group.

load e100b.lan slot=10001 frame=ethernet_802.2 name=primary_8022
load e100b.lan slot=10001 frame=ethernet_802.3 name=primary_8023
load e100b.lan slot=10002 frame=ethernet_802.2 name=secondary_8022
load e100b.lan slot=10002 frame=ethernet_802.3 name=secondary_8023
bind ipx to primary_8022 net=f001
bind ipx to primary_8023 net=f002
MSP BIND 10001 10002

The MSP Bind command can also be issued specifying logical names associated with the primary and secondary NICs. For example:

MSP NAMEBIND primary_8022 secondary_8022

Once the MSP BIND or MSP NAMEBIND commands have been issued, a MULTISPAN group is created for all logical frame types supported by the NIC. In addition, the probing mechanism becomes active for the current base frame. In the case of above example group gets created for frame type of ETHERNET_802.2 and ETHERNET_802.3. When a group gets created, MULTISPAN performs "Link Intergrity" check to make sure that all the NICs in the group are accessible from one to another by using the same probing mechanism described earlier. If the check fails the user is displayed with appropriate error messages.

The MULTISPAN NLM gains control over the network activity by registering a prescan protocol stack for sends and receives. The purpose of a prescan protocol stack is to provide the ability to examine the packets flowing between protocol stacks and drivers. MULTISPAN also intercepts the MLID registration process by patching the LSL portion of server code during the software load time. In Netware, protocol stacks send packets via LSL using a buffer known as ECBs (Event Control Block), which not only contains the address of the packet payload and its length but also contains information such as about which NIC to use and what frame type to use on the medium. This information is helps LSL in deciding the driver interface it needs to correspond to, in sending a packet. When LSL corresponds to MULTISPAN PreScan stack, it uses the same data structure to pass in information.

As illustrated in FIG. 3, a packet 102 is sent from the IPX protocol stack 100 via LSL 112. The LSL checks the registered pre-scan stack and calls the MULTISPAN PreScan send handler routine. The MULTISPAN PRESCAN process 110 determines the NIC through which the packet is to be sent.

Once the packets 102 and 104 have been analyzed by the MULTISPAN prescan module 110, they are output to their target network interface driver 120 and 122 respectively, and thereafter sent to the network backbone 12. By way of illustration, the packet 104 could be routed through the MULTISPAN prescan module 110 to a secondary network interface card driver 122 and thereafter out to the network backbone 12. It should be noted that during normal operations, Novell NetWare would only allow packets to flow through a single network interface card. MULTISPAN presents the primary NIC of each group as this single adapter, transparently applying its load sharing and failure recovery functions to the group.

Thus, data packet 104 can be sent to the LSL 112 with information to route it through the primary driver 120 to a NIC 124. However, in order to distribute the load, the MULTISPAN prescan module 110 intercepts the packet 104 and alters its destination so that it flows through the secondary driver module 122 to the NIC 126 and out to the network backbone 12.

By the same mechanism, if the primary driver 120 or primary NIC 124 fails, the MULTISPAN prescan module 110 can route the packet 102 into the secondary driver 122 and out to the NIC 126. By determining the destination of every packet coming through the LSL, the MULTISPAN prescan module 110 can completely control the ultimate destination of each packet.

During the load process, the MULTISPAN module patches the server code for the NetWare functions LSLRegisterMLIDRTag( ) and LSLDeRegisterMLID( ). In addition, the MULTISPAN module allocates enough memory needed for maintaining information pertinent to logical boards such as the address of the DriverConfigTable, Multicast address list, and original DriverControlEntry. Initialization related to generating NetWare Alerts is done at this point and an AESCallBack procedure is scheduled for managing the probing functionality.

After loading the MULTISPAN.NLM, the user can configure the system to load drivers for both the primary NIC and one or more secondary NICs using the INETCFG command or by manually editing AUTOEXEC.NCF or manually loading drivers at the system console. The user can also choose the appropriate protocol stack to bind with for every instance of the primary NIC. Once this process is done, the MULTISPAN BIND command can be issued to associate NICs together into a group, and designate a primary adapter for the group.

As part of initialization, LAN drivers typically make call to register their instance with LSL via LSLRegisterMLIDRTag. This call manages all information pertinent to an occurrence of a logical board and assigns the caller with next logical board available. When the LSLRegisterMLIDRTag function is called by the NetWare drivers (MLIDs), control jumps to the MULTISPAN code as a result of a patch in the LSL made by the MULTISPAN module while loading. The MULTISPAN system saves the addresses of certain MLID data structures and maintains internal tables for every logical board. This information is passed to the real target of the MLID's call.

This technique allows embodiments of the MULTISPAN system to intercept certain dialogs between the MLID and the LSL or the protocol stacks for such purposes as establishing or changing multicast address lists and the Driver-Config Table. When a fail-over takes place, the MULTISPAN system can retrieve the multicast list from the local internal table and send a multicast update call to the switched-over NIC.

In addition to intercepting the control handler, MULTISPAN also intercepts the DriverReset call. When the DriverReset call fails for some reason (e.g., NIC is powered off during hot swap), MSM usually removes the instance of that driver from memory and makes it impossible to activate the driver for that particular instance. By intercepting the reset call, MULTISPAN can tell MSM that reset was successful but generate an NetWare Alert for failure of a particular adapter. Since MULTISPAN knows which NIC is active and which is not, it ensures that there are no side effects in doing this kind of interception.

Once the MULTISPAN BIND command is issued, the bind procedure locates the appropriate logical boards corresponding to the arguments specified and creates a MULTISPAN group for all logical frames that the NIC currently supports. The primary NIC is specified first, followed by one or more secondary NICs. The MULTISPAN process forms a group only if there is a match for frame-type across all NICs specified. Note that the primary NIC should have a protocol stack bound to it and that a secondaries should not have any protocol stack bound to them.

Once a MULTISPAN group of NICs is created, the probing module starts sending probe packets from the primary NIC to all secondary NICs and from all secondary NICs to the primary NIC to monitor the status of the network link. The structure of a the payload portion of a probe packet is illustrated by the data structure definition below:

```
struct HEART_BEAT {
    LONG signature;//LONG value of 'NMSP'
    LONG seqNo; //sequence number of the probe packet sent.
    LONG pSource;//pointer to structure pertaining to the source board
    LONG pDestn;//pointer to structure pertaining to the
    destination board
};
struct IPX_HEADER {
    WORD checkSum;//0xFFF always
    WORD packetLength; //size of IPX_HEADER + size of
    HEARTBEAT
    BYTE transportControl;//zero,not used
    BYTE packetType;//IPX_PACKET
    BYTE destinationNetwork[4];//zero
    BYTE destinationNode[6];//corresponds to node address of
    destination board.
    WORD destSocket;//value returned by IPXOpenSocket() call.
```

```
        BYTE sourceNetwork[4];//zero
        BYTE sourceNode[6];//corresponds to node address of source board
        WORD sourceSocket;//value returned by IPXOpenSocket() call.
};
struct PROBE_PACKET {
        IPX_HEADER ipxHeader;
        HEART_BEAT heartBeat;
};
```

If any packets are not received, MULTISPAN system re-transmits the probe packet for a specified number of times. If there is a repeated failure, the MULTISPAN system determines which NIC failed by analyzing which packets were received and which were not, and removes the failing board from the bound group and deactivates the adapter by placing it in a wait mode. The MULTISPAN system thereafter monitors the deactivated board to determine if data packet reception begins to occur again on the deactivated board. If there is no packet reception for a specified time, MULTISPAN marks the board as dead. If the primary NIC is marked as dead, and there is at least one active secondary, then MULTISPAN does switch-over by causing a secondary NIC to be the primary. This is accomplished by shutting the board, changing the node address of the secondary NIC to that of primary NIC in the Driver Configuration Table (DCT) and then resetting the NIC. In addition, the multicast table of the original primary NIC is transferred to the switched-over primary and promiscuous mode is turned on if it was originally active for the primary.

In one embodiment, the MULTISPAN system also resets the source node address field in TCBs (Transmission Control Blocks) maintained by TSM for both failed and switch-over adapter. This is done to ensure that all load sharing NICs send packets with their current address, not the original address which was identified during load time thus eliminating the confusion with certain protocols (such as Ethertalk), which direct the requests to the node from which a reply was received.

Once the MULTISPAN system detects data packet reception on the old primary NIC, it activates the card to be a part of the group. The reactivated card then becomes a new secondary. If load sharing is enabled, the MULTISPAN system begins to use the board to share the outbound traffic. The fail-over process works the same way on this new configuration as before.

In order to load share the outbound traffic, MULTISPAN requires at least one secondary in a group. This feature can be enabled or disabled during runtime through the MULTISPAN LOAD SHARING command, which toggles this mode. When a packet is sent from the protocol stack 100 to the primary NIC 124 (the board which is known to the protocol stack), the MULTISPAN system intercepts the request and selects the next active board from the group on which the packet could be sent and changes the board number to the one selected. In one embodiment, the algorithm is based on a round-robin mechanism where every NIC in the group gets a turn to send packets. If a selected board in the bound group is marked "DISABLED", the MULTISPAN system bypasses that board and selects the next active board in the group. In another embodiment, the algorithm used makes a calculation based on the destination address in order to make routing of outgoing packets predictable to switches or routers connected to the group's NICs.

During load sharing, the MULTISPAN system changes the SendCompleteHandler in the Event Control Block (ECB) of the data packet to point to MULTISPAN primary NIC SendCompleteHandler. The purpose of this is to restore the original board number when the ECBs get handed back to the protocol stack through the LSL. This also fixes the problem when the system is running with Novell's IPXRTR product, wherein the Netware Core Protocol (NCP) does not recognize SendCompletes on the secondary NIC to which the protocol stacks are not bound.

Although the MULTISPAN system has been described above in relation to a Novell Netware implementation, the system is not so limited. For example, the MULTISPAN process can be implemented within other network operating systems such as Microsoft Windows NT, as discussed below.

Windows NT Implementation

Figure 4:
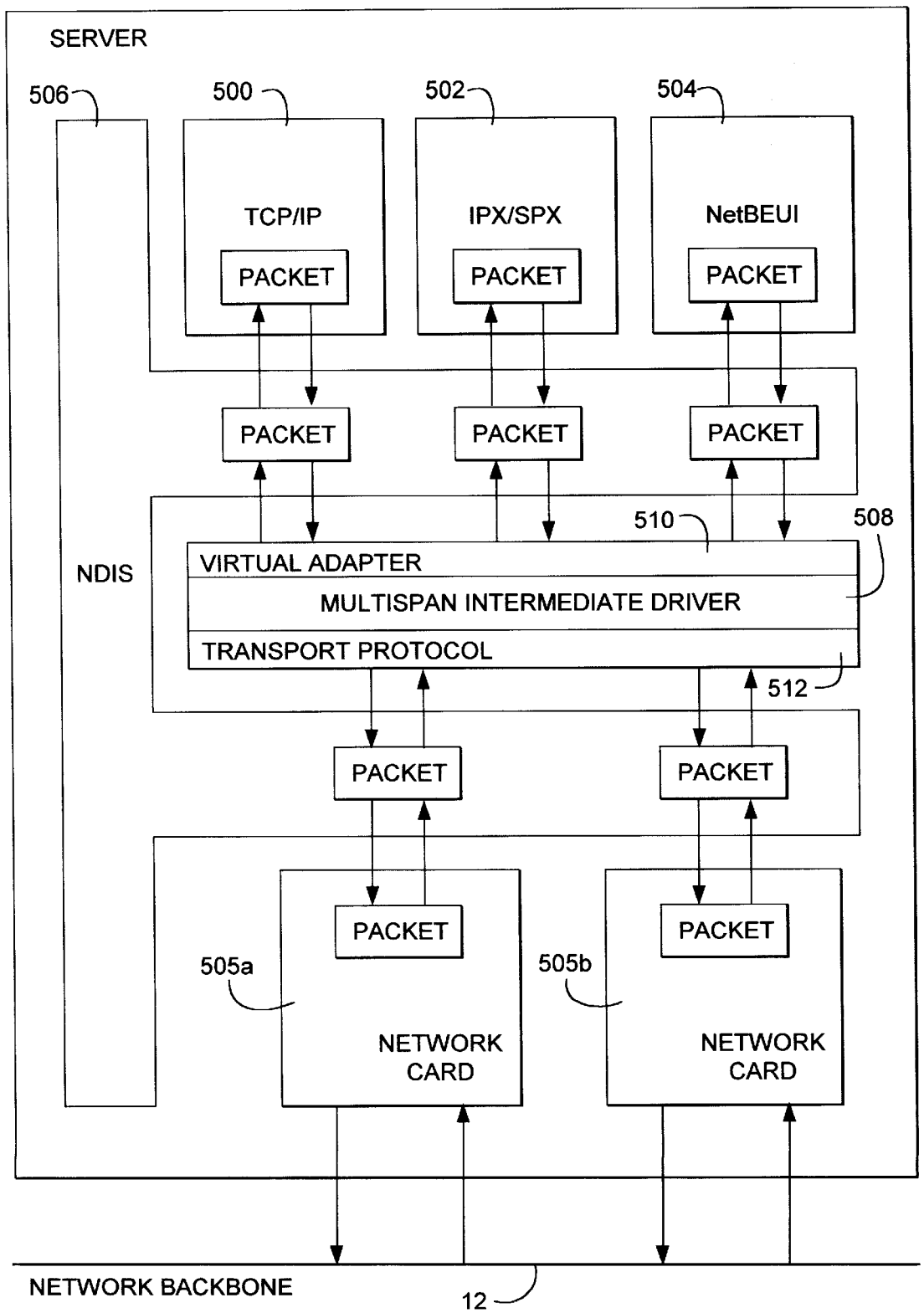
FIG. 4 is a block diagram illustrating an implementation of software modules running within a server computer under a Microsoft® Windows® NT network operating system.

FIG. 4 is a block diagram illustrating some of the major functional components of a Microsoft® Windowsoft® NT system for transferring data between a plurality of protocol stacks 500, 502 and 504 and a plurality of NICs 505a,b in accordance with an aspect of the present invention. The protocol stacks include TCP/IP protocol stack 500, IPX/SPX (Synchronous Packet Exchange) protocol stack 502 and NetBEUI protocol stack 504. These protocol stacks connect to NDIS 506, which is part of the Microsoft® Windows® NT operating system. NDIS 506 connects to NICs 18, 20 & 22 and additionally connects to a MULTISPAN system 508, which performs load sharing and fail-over functions.

A variety of references and device driver development kits are available from Microsoft describing the LAN driver model, NDIS, and how they interact. These will be familiar to anyone of ordinary skill in writing such drivers for Windows NT. The MULTISPAN system 508 is an NDIS 4.0 intermediate driver. FIG. 4 illustrates the relationship between the NDIS wrapper, transport protocols, NIC driver, and MULTISPAN driver in a Windows® NT system.

When the MULTISPAN driver 508 loads, it registers itself as an NDIS 4.0 intermediate driver. It creates a virtual adapter 510 on its upper edge for each group of NICs. The virtual adapter 510 binds to the transport protocols 500, 502 and 504 (e.g., TCP/IP, IPX/SPX). The lower edge 512 of the MULTISPAN driver 508 behaves like a transport protocol and binds to network interface cards 505a,b. When, for example, the TCP/IP protocol stack 500 sends out packets, they are intercepted by the MULTISPAN driver 508 first. The MULTISPAN driver 508 then sends them to the appropriate network adapter 505a or 505b. All the packets received by the NICs are passed to the bound MULTISPAN driver 508. The MULTISPAN driver then decides whether it should forward the packets to the transport protocols, depending on the state of the adapter.

The MULTISPAN driver is also responsible for verifying the availability of bound NICs. It detects adapter failures by periodically monitoring the activity of the NICs, as will be discussed in more detail below. If an adapter has failed, the MULTISPAN driver 508 disables the adapter and records it in the event log. If the failed NIC was a primary adapter, the MULTISPAN driver selects a secondary NIC to become the primary adapter.

Since Windows® NT does not allow the network address of a NIC to be changed dynamically, all the NICs bound to the MULTISPAN driver are configured to the same physical address when they are loaded. When the primary adapter fails, the MULTISPAN driver disables it and starts sending and receiving packets through a secondary adapter.

The MULTISPAN driver 508 continuously tracks the state of bound network interface cards. There are three different states for network interface cards. The "IN_USE" state means that the adapter is the primary adapter. All packets will be sent and received through this adapter when the load sharing feature is disabled. When load sharing is enabled, packets are sent out from all available NICs. The "READY" state means the adapter is in standby mode, but is operating correctly. When the primary adapter fails, one of the adapters in the "READY" state is changed to the "IN_USE" state and begins to send and receive packets. When the adapter cannot send or receive packets, it is set to a "DISABLED" state. The MULTISPAN driver sends packets out from the primary adapter (the NIC in "IN_USE" state). It simply passes packets received from the primary adapter up to the protocols and discards packets received from all the other adapters.

The MULTISPAN driver 508 continuously monitors the activity of any bound adapters. In most LAN segments, "broadcast" packets are periodically sent out by different machines. All the NICs attached to the LAN segment should receive these packets. Therefore, if a network adapter has not received any packets for an extended period of time, it might not be functioning correctly. The MULTISPAN driver 508 uses this information to determine if the bound network interface card is functioning correctly. For those LAN segments where no stations send out broadcast packets, the MULTISPAN driver sends out probe packets, as discussed above in the Novell Netware implementation. All the NICs should receive probe packets, since they are broadcast packets. A NIC will be disabled if it does not receive these probe packets.

When the network adapter is in an "IN_USE" state, and its receiver idle time exceeds a pre-set threshold, that adapter might not be operating correctly. The Receiver idle time for a NIC is the time that has elapsed since the last packet was received by the NIC. The MULTISPAN driver then scans through all the adapters in the "READY" state. If the receiver idle time of an adapter in a "READY" state is shorter than that of the primary adapter, the MULTISPAN driver disables the primary adapter by setting it to the "DISABLED" state and changes the adapter in "READY" state to the "IN_USE" state. This adapter then becomes the primary adapter. The MULTISPAN system will now begin using the new network adapter to send and receive packets.

If the adapter is in a "READY" state and has not received any packets for a period of time, the MULTISPAN driver places the adapter in a "DISABLED" state. If the adapter is fixed and starts receiving packets, it is changed to the "READY" state.

The MULTISPAN driver uses an adapter packet filter to reduce the overhead introduced by the secondary adapters the MULTISPAN driver sets the packet filter depending on the state of the adapter. When the adapter is in the "IN_USE" state, the filter is set by transport protocols. Normally, transport protocols set the filter to receive broadcast, multicast and directed packets. When the adapter is in the "READY" state, the packet filter is set to receive only multicast and broadcast packets. This should minimize the impact on performance. An adapter in the "DISABLED" state will receive all broadcast multicast and directed packets. Once the adapter is replaced or the cable is reconnected so that the adapter can again receive packets, it is switched to the "READY" state and its packet filter is set accordingly.

Windows NT uses a registry database is to store configuration information. Each driver in Windows NT has at least one entry in the following subkey:
HKEY_LOCAL_MACHINE\SYSTEM\CurrentControlSetServices The drivers can store configurable parameter values under the driver's subkey. NDIS drivers also store binding information inside the subkey. For a normal NDIS NIC driver, one entry is created for the NDIS miniport interface and one subkey is created for each adapter that is installed.

As discussed above, MULTISPAN is an NDIS intermediate driver which has a miniport interface on its upper edge and a transport interface on its lower edge. Each interface needs a separate subkey to describe it.

After installing the MULTISPAN driver, the installation program (oemsetup.inf) creates
HKEY_LOCAL_MACHINE\SYSTEM\CurrentControlSet\Services\mspan
for its NDIS transport interface and
HKEY_LOCAL_MACHINE\SYSTEM\CurrentControlSet\Services\mspm
for its NDIS miniport interface. It also creates
HKEY_LOCAL_MACHINE\SYSTEM\CurrentControlSet\Services\mspa#
for each virtual adapter installed, where # is the adapter number assigned by Windows NT. For each NIC bound to the MULTISPAN driver, a Span subkey is created under
HKEY_LOCAL_MACHINE\SYSTEM\CurrentControlSet\Services\NETCARD#\Parameters.
to configure how the NIC is bound to the MULTISPAN virtual adapter.

There are two entries in the Parameters subkey. "Connect" stores the name of the virtual MULTISPAN adapter to which the NIC is connected. All network interface cards belonging to the same group will have the same Connect value. "Number" stores the sequence number of the adapter. Number zero means that this adapter is the primary adapter of the adapter group. For example, the registry might resemble the following:
HKEY_LOCAL_MACHINE\SYSTEM\CurrentControlSet\Services\E100B1\Parameters.
   Connect: REG_SZ: mspa3
   Number: REG_DWORD: 0x1

The installation script also creates a Network Address under the Parameters subkey of all bound adapters. This stores the actual MAC address used for the adapter group.

The MULTISPAN driver stores configurable parameters in
HKEY_LOCAL_MACHINE\SYSTEM\CurrentControlSet\Services\mspa#\Parameters.

The following are values in the subkey of the REG_DWORD data type CheckTime, DisableTime, IdleTime, ProbeTime, LoadBalance. Network Address is a value in the subkey of the REG_SZ type. These values are described in detail in the following section.

There are five different parameters in the Windows NT registry which control the behavior of the MULTISPAN driver. The user can set these parameters based on the operational environment.

Check Time determines how often the MULTISPAN driver checks if the adapter is still alive. The recommended value is 1000 milliseconds (1 second). The maximum value is 1000 seconds in some embodiments.

Probe Time determines if the MULTISPAN driver should send out a probe packet if the bound adapter has not received a packet for the specified period of time. For example, if the Probe Time is set to 2000 milliseconds, the MULTISPAN driver will send out a probe packet if the adapter has not received any packets during a two second interval. If the Probe Time is set to 0, no probe packet will be sent out. The Probe Time value should be either greater than or equal to the Check Time, unless it is zero. The default value is 3000 milliseconds.

Disable Time determines when the MULTISPAN driver is to disable a bound adapter. If the adapter has not received any packets in the specified time, the MULTISPAN driver disables the adapter. The default value is 8000 milliseconds.

Idle Time determines when the MULTISPAN driver should switch to the secondary adapter if the primary adapter has not received any packets within the specified time period. The Idle Time value should be greater than the Check Time and Probe Time values. The default value is 4000 milliseconds.

FIG. 5 illustrates the structure of a probe packet for an Ethernet system in accordance with an aspect of the present invention. The packet includes a number of fields, including a destination address 700, source address 702, packet type 704 and adapter ID 706.

Since Windows NT does not allow the network address of a NIC to be changed dynamically, all the NICs that are bound to the same MULTISPAN virtual adapter are configured to the same physical address when they are loaded, which is called the MULTISPAN Virtual Network Address. Ethernet hardware addresses are 48 bits, expressed as 12 hexadecimal digits. The first 2 digits have to be 02 to represent the locally administrated address. It is recommended that 00 be used as the last two digits to support load sharing. The MULTISPAN Virtual Network Address should appear as follows:

0x02XXXXXXXX00 where XXXXXXXX are arbitrary hexadecimal numbers. This address has to be unique among single Ethernet segments.

FIG. 6 illustrates the structure of a probe packet for FDDI and token ring networks. The probe packet illustrated in FIG. 6 includes Access Control (ACS CTL) 800, Frame Control (FRM CTL) 802, destination address 804, source address 806, Destination Service Access Point (DSAP) 808, Source Service Access Point (SSAP) 810, CTL 812, protocol 814, packet type 816 and adapter ID 818.

Since an FDDI and Token-Ring networks do not allow two adapters with the same network address to coexist on the same network segment, the same mechanism described in the Ethernet section cannot be used to handle the fail-over process. The MULTISPAN driver therefore uses special FDDI and Token-Ring NIC drivers to provide the mechanism for resetting the NIC and changing the network address. On startup, only the primary adapter's address is overwritten to the MULTISPAN Virtual Network Address. All the other adapters use the address which is generated from Virtual Network Address and the adapter number assigned by NT. When the primary card has failed, MULTISPAN resets and changes the address of the primary adapter to the address generated from Virtual Network Address and its adapter number; it then resets and changes the network address of the secondary adapter to the MULTISPAN Virtual Network Address and uses that card as the primary adapter.

FDDI network addresses are 48 bits long, expressed as 12 hexadecimal digits. The first 2 digits have to be 02 to represent the address of the locally administrated station. It is recommended that 00 be used as the last two digits to support load sharing. The MULTISPAN Virtual Network Address should appear as follows:

0x2XXXXXXXX00 where XXXXXXXX are arbitrary hexadecimal numbers. This address must be unique within a single ring segment.

Figure 7:
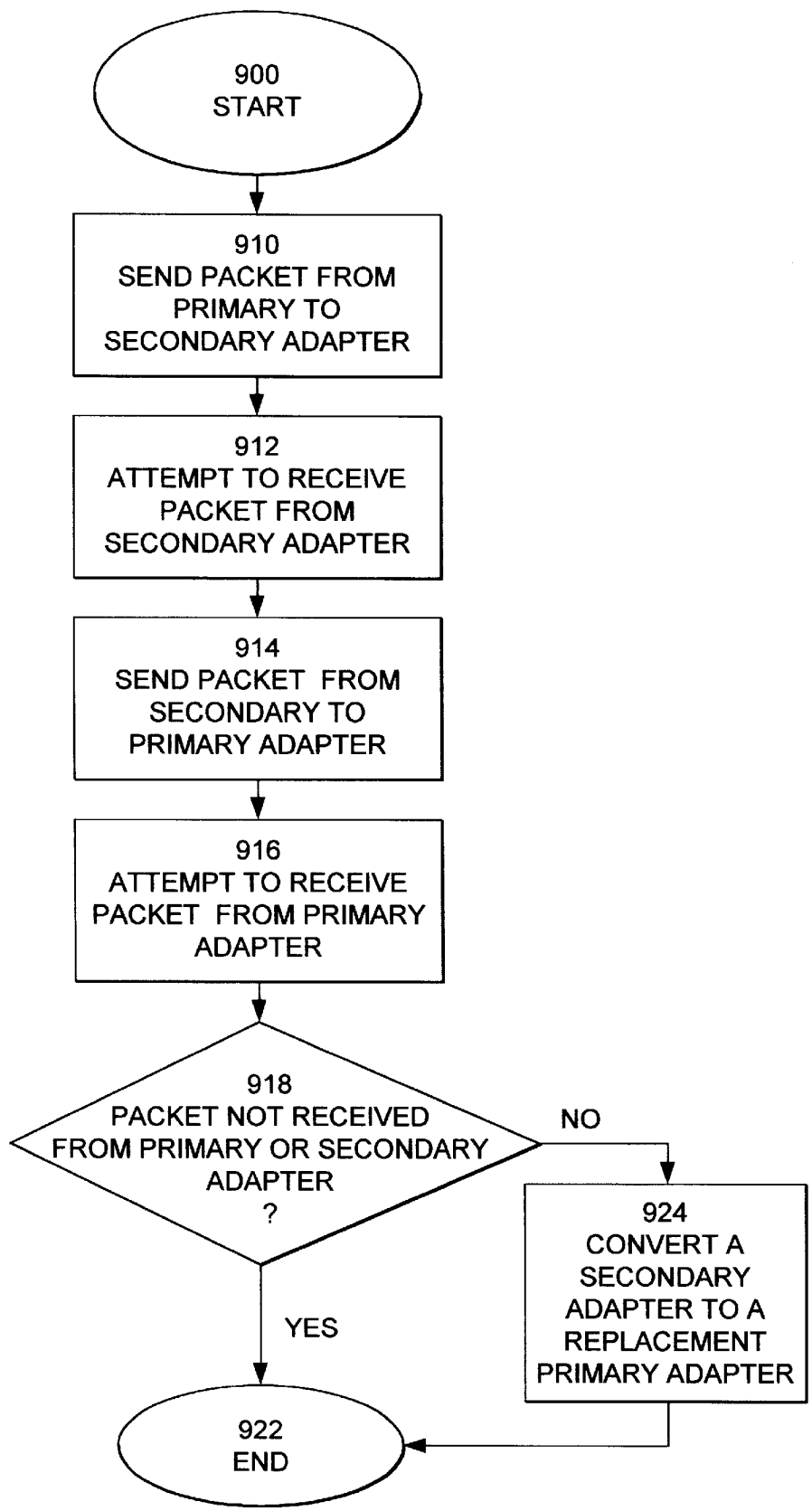
FIG. 7 is a flow diagram illustrating one embodiment of a process for determining whether a network interface adapter has failed.

FIG. 7 is a flowchart illustrating one embodiment of a method for determining whether a network adapter has. The network adapters are divided into a primary adapter and a plurality of secondary adapters. The method illustrated in FIG. 7 determines whether the primary adapter has failed. The method begins at state 900 which is a start state.

The system next advances to state 910 in which a packet is sent from the primary to a secondary adapter. In one embodiment, the primary sends packets to all of the secondary adapters in sequence. Next, the system advances to state 912. In state 912, the system attempts to receive a packet from the secondary adapter. The system next advances to state 914. At state 914, the system sends a packet from a secondary adapter to the primary adapter. In one embodiment, all of the secondary adapters send a packet to the primary adapter. The system next advances to state 916. At state 916, the system attempts to receive a packet from the primary adapter. The system next advances to state 918.

At state 918, the system determines whether a packet has not been received from the primary adapter or if the packet has not been received from the secondary adapter. If no packets have been received from either the primary or secondary adapter, the system assumes that the primary adapter has failed. The system then advances to step 924. At step 924, the system converts a secondary adapter to a replacement primary adapter. The system then proceeds to state 922, which is an end state. At state 918, if a packet had been received from either the primary or the secondary adapter, then the system assumes that the primary adapter has not failed and it proceeds to the end state 922.

Figure 8:
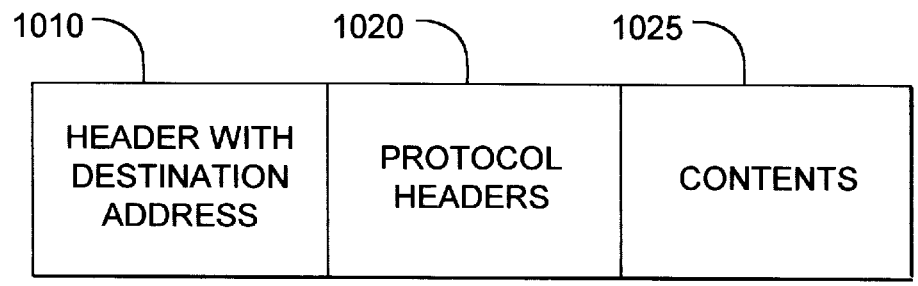
FIG. 8 is a block diagram of one embodiment of a MAC level packet, including a header, destination address and contents.

One embodiment of the present invention operates at the MAC level and lower, thus avoiding the complexity of providing software support for higher layer protocols. As indicated in FIG. 8, the structure of a MAC-level packet 1005 illustrated. These packets include a header with a destination address 1010 and protocol-level header 1020 for storing protocol information for protocols such as TCP/IP, IPX/SPX and NET BEUI. In addition, the MAC packet 1005 can include contents 1025.

Figure 9:
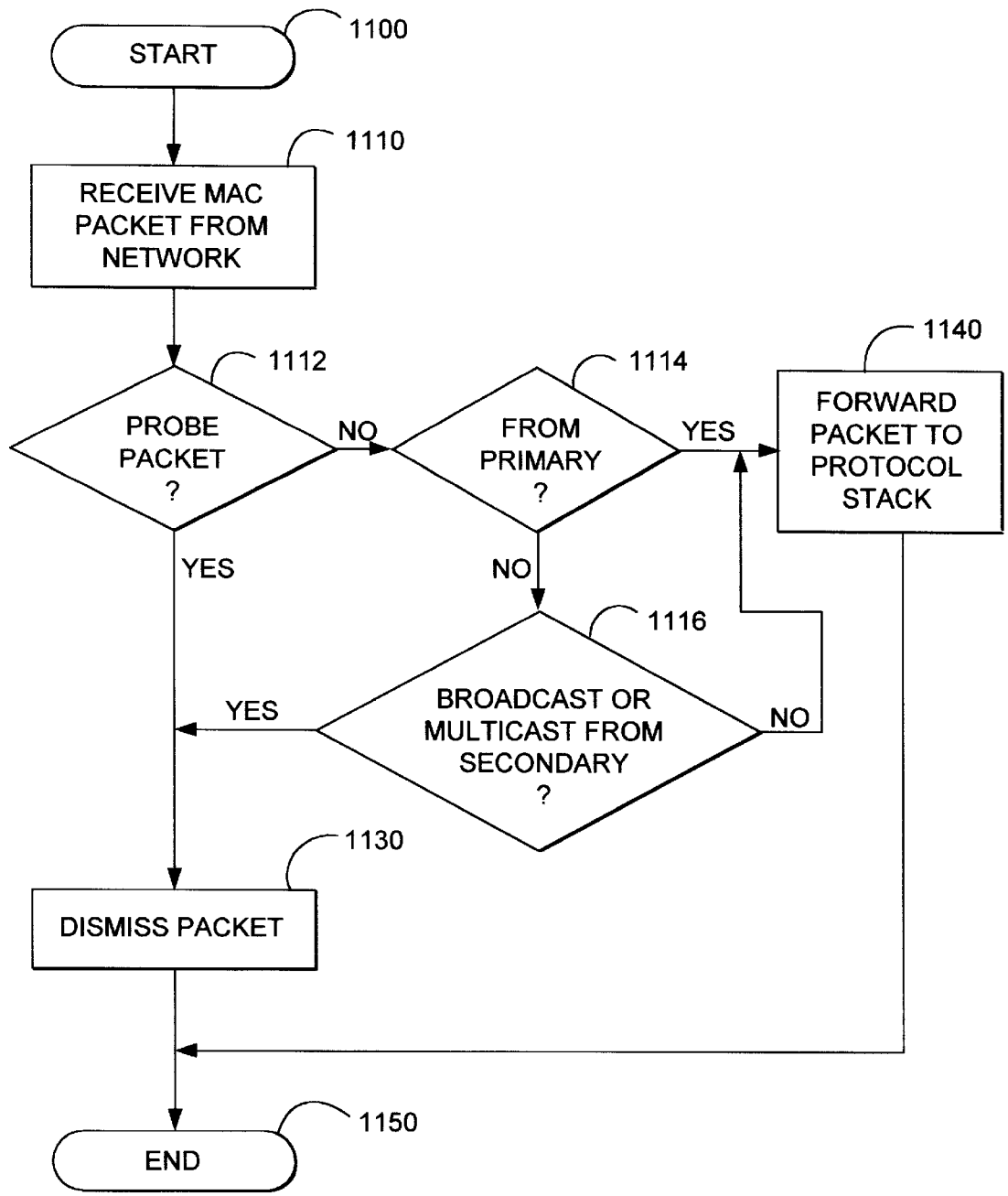
FIG. 9 is a flow diagram illustrating one embodiment of the steps involved in moving data packets between network interface cards and protocol.

FIG. 9 is a flow chart illustrating some of the steps involved in receiving packets through the NICs using the apparatus illustrated in FIGS. 3 and 4 in accordance with one embodiment of the present invention. The process starts at start 1100 which is a start state. The system next proceeds to state 1110 when a NIC of a group receives a first MAC-level packet from the network. The system next proceeds to decision state 1112, wherein the MULTISPAN system determines whether the packet is a probe packet. If the packet is a probe packet, then the system moves to state 1120 and updates the state of the NIC to indicate that the probe packet has been sent correctly. The system then moves to state 1130 wherein the packet is dismissed and the process terminates at end state 1150 without forwarding the packet to any protocol stack.

If a decision is made at decision state 1112 that the packet is not a probe packet, then the system moves to decision state 1114 to determine whether the packet is from a primary NIC. If so, then the system proceeds to state 1140, where the packet is passed to the protocol stack. Thus, the normal packet receive path is from state 1110 to 1112 to 1114 to 1140 then to 1150, the end state.

If a determination is made at decision state 1114 that the packet is from a secondary (not a primary) NIC, then system proceeds to a decision state 1116 to decide whether the packet is a multicast or broadcast packet. If the packet is a multicast or broadcast packet, then the system assumes that the same packet was received by all NICs in the group, and the system proceeds to state 1130 to discard the packet. However, if the packet is not a broadcast or multicast packet at decision state 116, the system proceeds to state 1140 and passes the packet to the protocol stack for processing. In some embodiments, state 1140 will make all packets forwarded to the protocol stack look like they arrived through the primary NIC.

Figure 10:
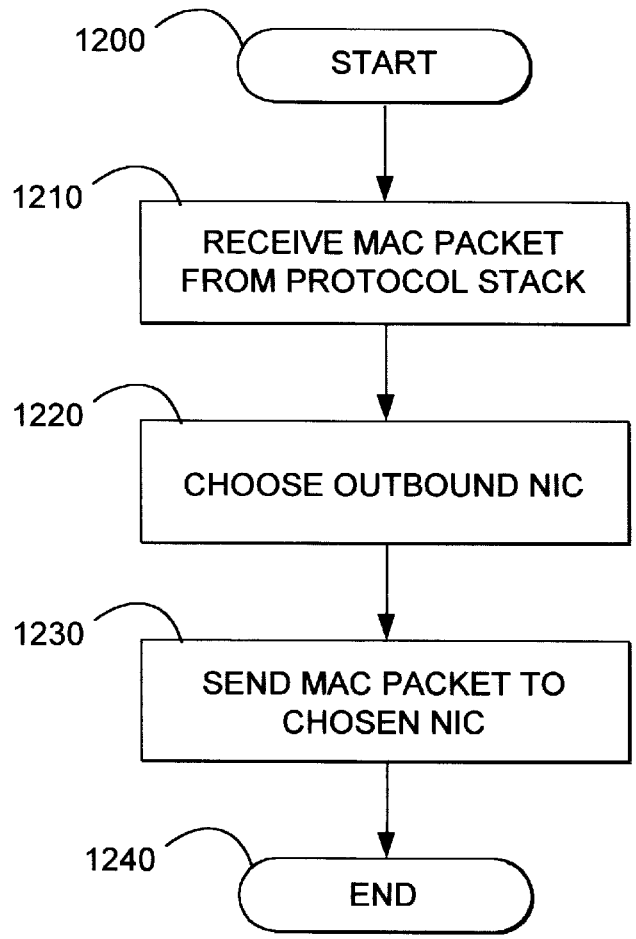
FIG. 10 is a flow diagram illustrating one embodiment of the steps involved in load sharing data packets across a plurality of network interface cards.

FIG. 10 is a flow chart illustrating some of the steps involved in load sharing packets across a plurality of NICs in accordance with one embodiment of the present invention. The process starts at a start state 1200 and then moves to state 1210 wherein the system receives a MAC-level packet from a protocol stack. The system next proceeds to state 1220 selects a NIC to send out packets from the plurality of NICs according to an algorithm specific to one embodiment of the invention. Some embodiments will choose a NIC that is less loaded than at least one other NIC in the plurality of NICs. The system then proceeds to state 1230 and routes the MAC-level packet to the NIC selected at state 1220. The system the terminates at an end state 1240.

MULTISPAN COMMAND REFERENCE

| Command | : MSP BIND |
|---|---|
| Description | : |

Used for creating multispan group by specifying slot numbers (port number if slot is NULL) of primary and secondary NICs.

| Format | : MSP BIND PrimarySlotNo SecondarySlotNo |
|---|---|
| | or |
| | MSP BIND PrimaryPortNo SecondaryPortNo |
| Example: | : MSP BIND 10001 10002 |
| | MSP BIND 0x5a 0x6a (used when slot number is NULL) |
| Default | : None |
| Messages | : |

For all successful creation of the MULTISPAN group, the MULTISPAN system displays "Group has been created for Primary Slot # xxxx and Frame_Type :yyyy". If there is a group already present, MSP displays error message "Group Already Present". MSP displays "failed to create a group", if multispan is unable to create group for at least one frame type supported by the NIC. Error Conditions:
1. No valid primary or secondary NIC
2. primary does not have any bound protocol stack
3. secondary has a protocol stack bound
4. Link Intergrity check failed

| Command | : MSP UNBIND |
|---|---|
| Description | : |

Used for deleting a multispan group from the list. To delete a group, the user specifies the slot number associated with primary NIC (port in case slot number is NULL). The group gets deleted automatically if LAN driver for that group is unloaded.

| Format | : MSP UNBIND PrimarySlotNo |
|---|---|
| Example: | : MSP UNBIND 10001 |
| Default | : None |
| Messages | : |

If successful, MSP displays "Cleaning up resources for group associated with Primary Slot #xxxx" for all frame types supported by NIC.

| Command | : MSP SEND TMO |
|---|---|
| Description | : |

Used for setting probe send timeout value. This command changes the values of MSP_PROBE_SEND_TIMEOUT variable for any given group, if there is a valid argument. MSP waits for MSP_PROBE_SEND_TIMEOUT seconds, when LSL has been requested to sendprobe packets and the request does not get acknowledged. After waiting for specified time, MSP retransmits the probe packet.

| Format | : MSP SEND TMO <SlotNo><ValueInSecs> |
|---|---|
| Example: | : MSP SEND TMO 10010 20 |
| Default | : 10 |
| Possible Values | : any non zero positive value. |
| Messages | : If no argument is specified or the specified argument is invalid, the current value is displayed, otherwise the new value is displayed and MSP_PROBE_SEND_TIMEOUT for the specified group is set to the new value. |
| Command | : MSP WAIT TMO |
| description | : |

Used to set the maximum wait time for receipt of a probe packet. This command changes the value of MSP_PROBE_WAIT_TIMEOUT variable for a specified group, if there is a valid argument.MSP waits for MSP_PROBE_WAIT_TIMEOUT seconds before marking the board "IN_ACTIVE" when the board is in WAIT_MODE and MSP has not detected any status change.

| Format | : MSP WAIT TMO <SlotNo><ValueInSecs> |
|---|---|
| Example: | : MSP WAIT TMO 10010 2 |
| Default | : 1 |
| Possible Values | : any non zero positive value. |
| Messages | : If no argument is specified or the specified argument is invalid, the current value is displayed. Otherwise the new value is displayed and MSP_PROBE_WAIT_TIMEOUT for the specified group is set to the new value. |
| Command | : MSP RETRY COUNT |
| Description | : |

Used to set maximum number of probe retry count. This command changes the value of MAX_PROBE_RETRY variable, if there is a valid argument. When probe packet fails to appear at the receive end, MSP will resend the probe packet until the retry count of MAX_PROBE_RETRY+1 is reached. After reaching this limit, MSP puts the board in WAIT_MODE.

| Format | : MSP RETRY COUNT <noOfRetries> |
|---|---|
| Example: | : MSP RETRY COUNT 2 |
| Default | : 1 |
| Possible Values | : any non zero positive value. |
| Messages | : If no argument is specified or the specified argument is invalid, the current value is displayed, otherwise the new value is displayed and MAX_PROBE_RETRY is set to the new value. |
| Command | : MSP HELP |
| Description | : |

Displays all the supported commands recognzied by MSP.

| | |
|---|---|
| Format | : MSP HELP |
| Example: | : MSP HELP |
| Command | : MSP NAMEBIND |
| Description | : |

Used for creating a multispan group by specfying logical names associated with primary and secondary NICs.

| | |
|---|---|
| Format | : MSP NAMEBIND PrimaryLName SecondaryLname |
| Example: | : MSP NAMEBIND primary_8022 secondary_8022 |
| Default | : None |
| Messages | : |

For all successful creation of group, MSP displays "Group has been created for Primary Slot #xxxx and Frame_Type :yyyy". If there is a group already present, MSP displays error message "Group Already Present". MSP displays "failed to create a group", if multispan is unable to create group for atleast one frame type supported by the NIC. Error Conditions:
1. there is no valid board for the name specified.
2. primary does not have any bound protocol stack
3. secondary has a protocol stack bound
4. Link intergrity check failed

| | |
|---|---|
| Command | : MSP PROBE INTERVAL |
| Description | : |

To set the inter probe packet delay. This command changes the value AES Wakeup Delay if there is a valid argument. This value gets effective only when the AESCallBack procedure makes a call to the server to reschedule another AES event. This mainly affects the interval at which successive probe packets are sent on the same board. If the delay is longer, MSP might take more time to recognize the adapter failure or link failure.

| | |
|---|---|
| Format | : MSP PROBE INTERVAL <inTicks> |
| Example: | : MSP PROBE INTERVAL 60 |
| Default | : 18 (one second) |
| Possible Values | : any non zero positive value. |
| Messages | : If no argument is specified or the specified argument is invalid, the current value is displayed, otherwise the new value is displayed. |
| Command | : MSP LOAD SHARING (Not Applicable for OEM) |
| Description | : |

To turn load sharing mode on or off. MSP load shares the outbound LAN traffic only if load sharing mode is ON. MSP load shares transmits only.

| | |
|---|---|
| Format | : MSP LOAD SHARING |
| Example: | : MSP LOAD SHARING |
| Default | : On |
| Messages | : Current state of the load sharing is displayed. |
| Command | : MSP RECEIVE TMO |
| Description | : |

To set the timeout value for receiving probe packet when sent from one board to another. This command changes the value MSP_RECEIVE_PROBE_TIMEOUT if there is a valid argument. The idea of providing this to satisfy variety of switches.

| | |
|---|---|
| Format | : MSP RECEIVE TMO <slotNo><inTicks> |
| Example: | : MSP RECEIVE TMO 10002 18 |
| Default | : 1 tick for Ethernet and FDDI. 18 ticks for Token-Ring. |
| Possible Values | : any non zero positive value. |
| Messages | : If no argument is specified or the specified argument is invalid, the current value is displayed, otherwise the new value is displayed. slotNo can be a hexadecimal value. |
| Format | : MSP DISPLAY STATUS <slotNo> |
| Example: | : MSP DISPLAY STATUS 10002 |
| Messages | : slotNo is optional. If the slotNo is not specified, MSP displays information for all the groups it knows about, otherwise only for slotNo is displayed on the console. |

Glossary

Fault-Tolerance: A computer system is fault-tolerant when it has the ability to continue operation despite the failure of one or more individual elements.

Redundancy: To implement fault-tolerance system components and data pathways are duplicated or mirrored in order to provide primary and backup components and data pathways.

Fault-Detection: A fault-tolerant system includes the ability to detect a failure in any of its components.

Fail-Over: A fault-tolerant system includes the ability to transition operational control from components that have failed to components that remain operational.

Load Sharing: In a computer system with redundant components, load sharing is implemented by controlling the data flow through one or another of at least two redundant operational data paths in order to maximize throughput.

Processor: Refers to any combination of processors on the system bus, on an IO bus, or within peripheral devices such as NICs. The processors may be any conventional general purpose single- or multi-chip microprocessor such as a Pentium processor, a Pentium Pro processor, a 8051 processor, a MIPS processor, a Power PC processor, or an Alpha processor. In addition, the processor may be any conventional special purpose processor such as a digital signal processor or a graphics processor, or network interface packet processor operating individually or in combination.

Program Code: Processing is implemented with a series of conditional instructions which collectively are referred to as program code. The program code may be stored in a memory or embedded in a logic unit.

Memory: Includes physical medium for storage of data either permanently or temporarily.

The foregoing description of embodiments of the invention have been presented for purposes of illustration and description only. They are not intended to be exhaustive or to limit the invention to the forms disclosed. Obviously, many modifications and variations will be apparent to practitioners skilled in the art.

We claim:

1. A method in a computer system of transferring control of network traffic between network interface cards (NICs), the method comprising:

determining the address of a first network interface card (NIC), the network interface card being enabled;

assigning said address to at least a second network interface card, the second network interface card being disabled;

sending at least one data packet from a protocol stack to said address;

disabling said first NIC if said data packet is not received in a predetermined period without receipt of additional packets elapses; and responsive to the disabling, enabling said second network interface card.

2. The method of claim 1, wherein said computer system is running under the Microsoft Windows NT operating system.

3. The method of claim 1, wherein said method of sending data packets from a protocol stack comprises the method of sending data from an IPX/SPX protocol stack.

4. The method of claim 1, wherein said method in a computer system is performed by a Microsoft Windows NT intermediate driver.

5. A method for disabling a failing network interface card comprising:

sending a probe from a protocol stack to a virtual adapter interface on an intermediate driver;

forwarding said probe packet from a transport protocol interface on said intermediate driver to a first network interface card (NIC);

attempting to receive said probe packets at a first NIC;

disabling said first NIC if said probe packet is not received in a predetermined period without receipt of additional packets elapses; and responsive to the disabling, enabling a second network interface card.

6. The method of claim 5, wherein said method sending probe packet comprises sending a probe packet to a Microsoft Windows NT intermediate driver.

7. The method of claim 5, wherein said method further comprises enabling said secondary NIC to receive data packets.

8. A method for detecting failures in a first network interface card (NIC) and sharing load balance, the method comprising:

transmitting a plurality of probe packets to the first NIC over a network using a second NIC;

responsive to not receiving one or more of the plurality of probe packets on the first NIC, waiting a predetermined period to receive packets on the first NIC;

if no packets are received on the first NIC during the predetermined period:

deactivating the first NIC, and assigning the second NIC an address corresponding to the first NIC; and routing a portion of a plurality of packets being generated by at least a first program for transmission over the first NIC for transmission over the second NIC.

9. The method of claim 8, wherein each of the packets includes a source media access control (MAC) address, and the routing further comprises modifying the source MAC address to indicate the second NIC.

10. The method of claim 8, wherein each of the packets includes an address, and the routing further comprises modifying the address to indicate the second NIC.

11. The method of claim 8, wherein the portion of the plurality of packets comprises all of the plurality of packets responsive to deactivating the first NIC.

* * * * *